Figure 1:
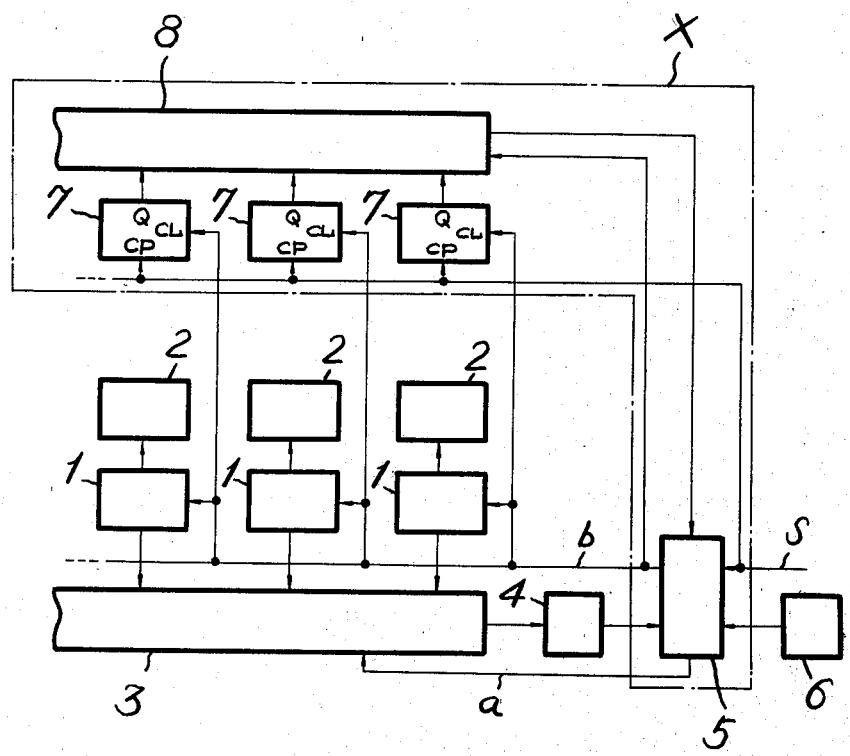

United States Patent [19]

Minamida et al.

[11] 4,396,078

[45] Aug. 2, 1983

[54] WEIGHING OR COUNTING METHOD WITH SOME UNFILLED HOPPERS

[75] Inventors: Kazukiyo Minamida; Yoshiharu Asai, both of Shiga, Japan

[73] Assignee: Kabushiki Kaisha Ishida Koki Seisakusho, Kyoto, Japan

[21] Appl. No.: 320,693

[22] Filed: Nov. 12, 1981

[30] Foreign Application Priority Data

Nov. 18, 1980 [JP] Japan ................... 55-162983

[51] Int. Cl.³ .................. G01G 19/22; B07C 5/16
[52] U.S. Cl. ........................................... 177/1; 177/25; 209/592; 364/567
[58] Field of Search ............... 177/1, 25; 209/592; 364/567

[56] References Cited

U.S. PATENT DOCUMENTS

| | | | |
|---|---|---|---|
| 2,802,658 | 8/1957 | Hensgen et al. | 177/25 |
| 3,708,025 | 1/1973 | Soler et al. | 177/1 |
| 3,939,928 | 2/1976 | Murakami et al. | 177/25 |
| 4,206,822 | 6/1980 | Mazzucchelli | 177/25 |
| 4,336,852 | 6/1982 | Hirano | 177/25 |
| 4,344,492 | 8/1982 | Hirano | 177/25 |

Primary Examiner—George H. Miller, Jr.
Attorney, Agent, or Firm—Armstrong, Nikaido, Marmelstein & Kubovcik

[57] ABSTRACT

Improvements in a weighing or counting method wherein on the basis of weight data on a plurality of groups of articles obtained from a plurality of weighing machines, the respective additive values of all possible or desired number of combinations are found, the additive value of a particular combination which is equal or the nearest to a set value is retrieved, and the weighing machines corresponding to the combination selected are actuated to discharge articles contained therein. During the discharge of articles from the weighing machines corresponding to the selected combination and during the subsequent feeding of fresh articles into the same weighing machines, similar combinatorial operation is effected on the basis of weight data from a fixed number of weighing machines which were not selected, or did not discharge their articles, and a particular combination whose additive value is equal or the nearest to the set value is determined as the combination for the next discharge.

3 Claims, 2 Drawing Figures

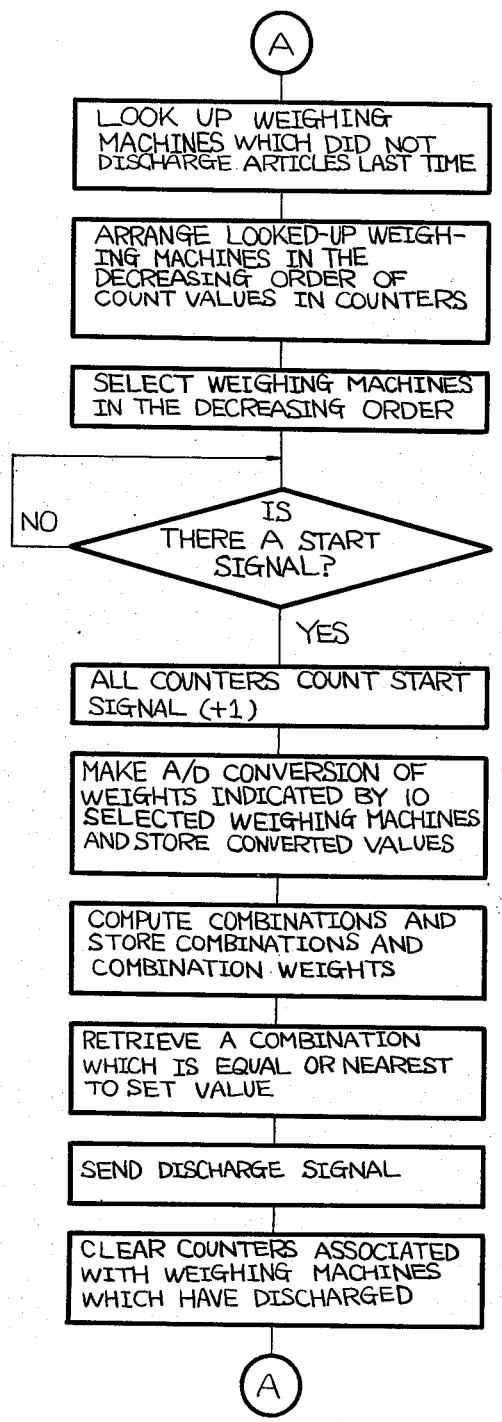

WEIGHING OR COUNTING METHOD WITH SOME UNFILLED HOPPERS

This invention relates to a combinatorial weighing or counting method used for an apparatus wherein combinations are computed on the basis of weight data on a plurality of groups of articles to find a particular combination whose additive value is equal or the nearest to a set value to discharge articles corresponding to the selected combination into a packaging machine or the like.

A combinatorial weighing or counting apparatus computes combinations on the basis of weight data obtained from a plurality of weighing machines, retrieves a particular combination whose additive value is equal or the nearest to a set value, and determines the selected combination as the one for discharge. In such apparatus, the discharge combination is found from the results of combinatorial computations and after the articles have been discharged, weight data necessary for combinatorial computations are not supplied from the weighing machines which have completed the discharge of their articles and are now empty until these weighing machines are fed with fresh articles, during which period, therefore, the operational functions remain stopped. Thus, the article discharge time interval in this conventional apparatus has been impossible to reduce to less than the sum of the time required for weighing machines to receive articles again after their discharge of articles and the time required for combinatorial computations.

With the above in mind, the present invention is intended to provide an improved combinatorial weighing or counting method which shortens the discharge time intervals. When the mechanism of the conventional combinatorial weighing or counting apparatus is studied, it is seen that whereas weighing machines which have discharged their articles cannot participate in combinatorial computations until they are fed with fresh articles, weight data are inputted from the remaining weighing machines which have not discharged their articles. If, therefore, combinatorial computations are performed with respect to the weight data from the remaining weighing machines to find the next discharge combination, it is possible to shorten the article discharge time intervals, accelerating or doubling the weighing or counting operation speed.

According to this invention, in combinatorial weighing or counting wherein combinations are computed on the basis of weight data from a plurality of weighing machines to find a particular combination whose additive value is equal or the nearest to a set value to discharge articles, combinations are computed on the basis of the weight data from a fixed number of weighing machines selected from the weighing machines which did not discharge their articles last time to find the next discharge combination, so that the combinatorial weighing or counting speed can be increased.

When it is desired to find a particular combination whose additive value is equal or nearest to a set value by means of combinatorial computations, a large number of weight data are required in order to assure sufficient accuracy. For example, if the number of weighing machines participating in combinatorial computations is ten, the number of all possible combinations is $2^{10} - 1 = 1023$, which may be said to be a sufficiently large number. On the other hand, if the number of weighing machines participating in combinatorial computations is five, the number of all possible combinations is $2^5 - 1 = 31$, with which it would be impossible to obtain a particular combination weight or number which is sufficiently near to a set value.

Therefore, in this invention, a sufficient number of weighing machines to provide sufficient accuracy plus some weighing machines the number of which is approximately equal to or greater than the number of weighing machines expected to discharge their articles in a single operation are used and combinations are computed on the basis of weight data obtained from these weighing machines, so that even if some weighing machines become empty due to the discharge of their articles, the remaining weighing machines allow combinatorial computations while ensuring sufficient accuracy. If the number of weighing machines participating in combinatorial computations is ten, the number of all possible combinations which are to be computed is $2^{10} - 1 = 1023$, but if fifteen weighing machines participate in combinatorial computations, it is necessary to compute $2^{15} - 1 = 32,767$ combinations, greatly increasing the computing time required, so that the efficiency is decreased. Therefore, in this invention, the number of weighing machines participating in combinatorial computations in a single operation is limited to a fixed value, e.g. ten, so as to avoid such drawback.

These and other objects and features of the invention will become more apparent from the following description given as an example with reference to the accompanying drawings, in which:

FIG. 1 is a block diagram showing a concrete example of an apparatus for embodying the method of the invention; and FIG. 2 is a flowchart showing operating procedures to be followed by the apparatus of FIG. 1.

In FIG. 1, the numeral 1 denotes a plurality (e.g., fifteen) of weighing machines; 2 denotes a plurality of feeders for feeding articles to the weighing machines 1; 3 denotes a multiplexer composed, e.g., of analog switches adapted to selectively pass weight data from the weighing machines 1 in response to control signals from an arithmetic unit to be later described; 4 denotes an A/D converter for converting analog weight data delivered from the multiplexer 3 into digital values; 5 denotes an arithmetic unit adapted to deliver control signals a to the multiplexer 3, perform combinatorial computations according to a predetermined procedure to obtain a particular combination whose additive value is equal or the nearest to a set value, and deliver discharge signals b to the weighing machines corresponding to the selected combination, causing these weighing machines to discharge their articles; 6 denotes a weight setting section for setting a weight value for discharge; 7 denotes a plurality of counters respectively associated with the weighing machines for counting the number of times when the associated weighing machine 1 did not discharge; and 8 denotes a selecting section which compares count values corresponding to weighing machines 1 into which discharge signals b were not inputted and selects a fixed number of weighing machines in the decreasing order of count values. The portion X surrounded with an alternate long and short dash line is the control section of this apparatus, composed of hardwear circuits using IC's or of a microcomputer.

The operation of this apparatus is performed according to the procedures shown in FIG. 2.

First, a weight value for articles to be combinatorially weighed and discharged is set by the weight setting section 6. The feeders 2 feed articles to the weighing machines 1 with suitable variations in amount. The amount to be fed is determined so that the total weight of articles in several (e.g. four or so) weighing machines is equal to the set value. When articles are fed, the arithmetic section 5 causes the selecting section 8 to look up the weighing machines which did not discharge last time and to arrange the count values in the counters 7 corresponding to the looked-up weighing machines in the decreasing order. A fixed number (e.g. ten) of weighing machines in the decreasing order of count values are selected therefrom. In addition, immediately after the start of operation, discharge signals b have not been delivered from the arithmetic section 5 and no distinction can be made between count values in the counters 7 since they are all zero because of initial setting. The order of selection in such case may be determined, e.g., by numbering the weighing machines and selecting them in the increasing order of numbers. This method of selection is also applicable where like count values are included in selecting count values in the decreasing order when the weighing operation is going on. Since count values are for the purpose of recording the number of times when weighing machines did not discharge, the selection of weighing machines in the decreasing order of count values serves to equalize the frequencies of operation of all weighing machines so that the latter have substantially the same life. As for the order of selection of weighing machines having the same count value, there are other methods than the one numbering the weighing machines described above. For example, it is possible to select weighing machines at random by producing random numbers in the arithmetic section 5.

Upon completion of the selection of weighing machines in this manner, a check is made of whether or not there is a start signal S from the packaging machine requiring a supply of articles. If there is no such signal, the check is repeated. When there is a start signal S, all counters 7 count it and their count values each increase by one. Judging that there is a start signal, the arithmetic section 5 allows the outputs from ten weighing machines 1 selected to successively pass by sending selection signal a to the multiplexer 3, these outputs being converted into digital values by the A/D converter 4 and stored in the arithmatic section 5. Combinations of the weight data on the ten selected weighing machines are computed, and the resulting combination weights and combinations are stored. A particular combination whose combination weight is equal to or nearest the set value is retrieved. When the combination for discharge to the packaging machine is determined upon completion of the retrieval, discharge signals b are sent to the corresponding weighing machines to discharge their articles. These discharge signals b are also sent to the counters 7 corresponding to the weighing machines 1 which are to discharge their articles, thereby clearing their count values to zero.

During discharge from these weighing machines 1, the control section X restarts to execute the program from the operating procedure Ⓐ. First, it looks up the weighing machines which did not discharge their articles last time. This is done by causing the selecting section 8 to check on the weighing machines 1 to which discharge signals b were not sent. The count values in the counters 7 corresponding to the looked-up weighing machines 1 are arranged in the decreasing order. Ten weighing machines 1 are selected in the decreasing order of count values. In this case, if six of the total of fifteen weighing machines are discharging their articles, the number of weighing machines which can take part in combinatorial weighing is nine; only these nine weighing machines will be selected. The control section then assumes its stand-by position checking whether or not there is a start signal S. If there is a start signal S, it computes combinations in the same manner as before and retrieves a particular combination equal or the nearest to the set weight for discharging articles, whereupon it returns to the position of the operating procedure Ⓐ. It looks up the weighing machines which did not discharge their articles. In this case, the weighing machines which discharged their articles last time but one have already been fed with articles. Therefore, the weighing machines except those which discharged their articles last time are looked up.

Thereafter, such operation is repeated, whereby combinations can be computed to find a particular combination for discharge next time during the discharge of articles from weighing machines and during the feeding of fresh articles to weighing machines, so that weighing and discharge can be done at double the conventional speed.

The method of computing combinations in this invention is not limited to the one described in the above embodiment. For example, rather than storing all combination weights which are the results of combinatorial computations, each time the computation of a combination is completed, it is compared with the set weight and only that one of the combinations computed so far which is the nearest to the set weight is stored, so that when all combinations have been computed, a particular combination which is equal or the nearest to the set weight will have been found.

While the above embodiment refers to combinatorial weighing, it goes without saying that the invention is applicable to combinatorial counting by dividing the total weight indicated by each weighing machine by the weight of a single article to convert the total weight into the number of articles. In this case also, combinations can be computed by any desired method and the conditions of the set value for discharge may be optional, such as conditions specifying the number of articles alone and conditions specifying both the number of articles and the weight.

In the above embodiment, the selection of a fixed number (e.g. ten) of weighing machines from those which did not discharge their articles has been made by comparing the count values in in the counters 7 and selecting them in the decreasing order. However, it is possible to select a fixed number of weighing machines without such conditions. In that case, weighing machines may be selected in the increasing order of numbers assigned thereto, and there is no need to provide the counters 7.

As many apparently widely different embodiments of this invention may be made without departing from the spirit and scope thereof, it is to be understood that the invention is not limited to the specific embodiment thereof except as defined in the appended claims.

What is claimed is:

1. A weighing or counting method including the steps of computing combinations on the basis of weight data from a plurality of weighing machines, retrieving a particular combination which is equal or the nearest to a set value and causing the weighing machines corresponding thereto to discharge their articles, said method being characterized in that during the discharge of articles from weighing machines and during the feeding of fresh articles to weighing machines, combinations are computed on the basis of weight data from a fixed number of weighing machines selected from the remaining weighing machines which did not discharge their articles to find a particular combination which is equal or the nearest to the set value, and deciding said particular combination as the combination for the next discharge.

2. A weighing method comprising the steps of weighing articles by a plurality of weighing machines, computing combinations of the weight values obtained from said plurality of weighing machines, retrieving a combination whose combination weight is equal or the nearest to a set weight from among said combinations, discharging articles from the weighing machines corresponding to said retrieved combination, computing combinations of the weight values from a fixed number of weighing machines selected from the remaining weighing machines which did not discharge their articles during the discharge of articles from said weighing machines or during the feeding of fresh articles to said weighing machines, and retrieving a combination whose combination weight is equal or the nearest to the set weight as the combination for the next discharge.

3. A counting method comprising the steps of weighing articles by a plurality of weighing machines, dividing the weight indicated by each weighing machine by the weight of a single article to convert it into the number of articles, computing combinations of these numbers, retrieving a combination whose combination number is equal or the nearest to set number from among said combinations, discharging the articles from the weighing machines corresponding to said retrieved combination, computing combinations of the numbers associated with a fixed number of weighing machines selected from the remaining weighing machines which did not discharge their articles during the discharge of articles from said weighing machines and during the feeding of fresh articles to said weighing machines, and retrieving a combination whose combination weight is equal or nearest to the set value as the combination for the next discharge.

* * * * *